(No Model.)

R. R. GUBBINS.
BUILDING CIRCULAR WOODEN STRUCTURES.

No. 603,138. Patented Apr. 26, 1898.

Witnesses
L. Cornes.
H. Summers.

Inventor.
Richard Russell Gubbins

UNITED STATES PATENT OFFICE.

RICHARD RUSSELL GUBBINS, OF LONDON, ENGLAND.

BUILDING CIRCULAR WOODEN STRUCTURES.

SPECIFICATION forming part of Letters Patent No. 603,138, dated April 26, 1898.

Application filed November 13, 1896. Serial No. 612,004. (No model.)

*To all whom it may concern:*

Be it known that I, RICHARD RUSSELL GUBBINS, a subject of the Queen of Great Britain, residing at 95 Pelton road, East Greenwich, London, S. E., England, have invented new and useful Improvements in Building Circular Wooden Structures, such as pulleys and the numerous cylindrical forms used in pattern-making, of which the following is a specification.

My invention relates to the production of the segmental pieces used in making wood pulleys, patterns, and the like and in the further building them up into circular forms, whereby a large saving both of labor and material is effected when compared with the method at present in vogue.

I attain my objects by the means illustrated in the accompanying drawings, in which—

Figure 1:
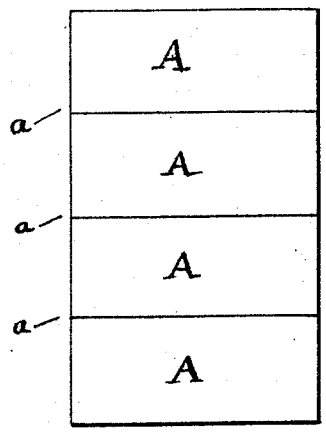
Figure 2:
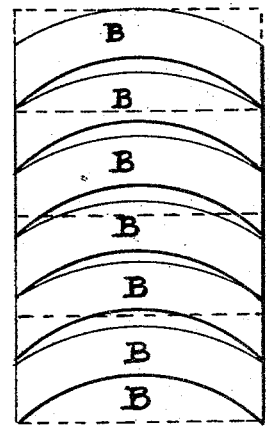

Figure 1 is a plan of the lumber prepared for sawing. Fig. 2 is a plan of the same after sawing, and Fig. 3 is a plan of segments built up on the face-plate of a lathe prior to being faced up for the succeeding tier.

Similar letters refer to similar parts throughout the several views.

A, Fig. 1, represents pieces of board or lumber of suitable dimensions glued together at *a a*, so as to make, so to speak, a board in which the grain runs crosswise. The edges at *a a* are squared and sized for jointing up, and it is then sawed by suitable means in pieces, as shown at B B, Fig. 2, bounded, respectively, by the inside and outside circumferences of the proposed circular structure and on the ends by the parallel sides of the so-called "board" from which they were sawed and which, it will be noted, are squared and sized ready for jointing.

Figure 3:
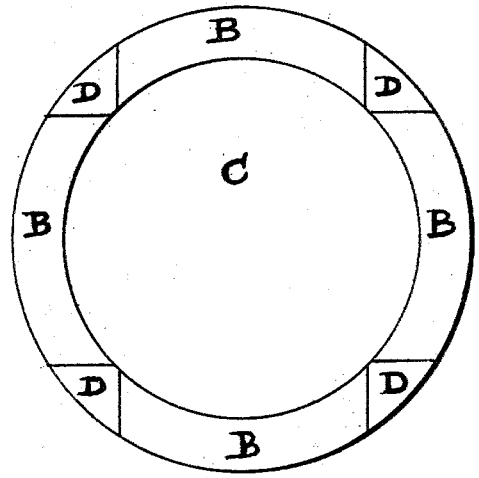

Fig. 3 shows four of the above-described segments B B built into a ring on the face-plate C, on which they will be faced up to receive the next tier. The length of the segments B B is such that when they are set in place their ends form right angles D D with one another. The spaces D D are filled up with small pieces of wood glued in as shown.

The economy of my invention may be taken as the measure of its utility, and as far as the material is concerned is shown on the drawings, Figs. 1 and 2, where four pieces of wood, each of which is only enough by itself to make one segment, when joined together cut up into six segments of the same size. The economy of labor is greater still. The segments are produced by a sawing device rapidly, and the end joints are made and sized all together. They are then only laid on the face-plate with their ends square with one another and the little square corner-pieces filled in.

What I claim as my invention, and desire to secure by Letters Patent, is—

1. The improvement in the art of making wooden pulleys, rims or similar rings which consists in uniting the longitudinal edges of pieces of boards to constitute a composite cross-grained board, planing parallel the cross-grained edges of the said board and sizing the same and dividing the said board into segments each segment bounded longitudinally by concentric arcs and at the ends by the planed edges of the board and gluing the segments with interposed pieces together to form said rims.

2. The ring composed of circular segments, B, having parallel ends, planed and sized, set so that the adjacent ends of each pair of segments are at right angles to one another, combined with the corner-pieces glued in, filling the spaces, D, between the said ends of the said segments, B, for the purpose set forth.

RICHARD RUSSELL GUBBINS.

Witnesses:
JOHN ALFRED DONNISON,
WILLIAM HOLMES.